United States Patent [19]

Freericks

[11] 3,922,086

[45] Nov. 25, 1975

[54] METHOD OF PROVIDING PHOTOCOMPOSITION INDICIA

[75] Inventor: Alfred H. Freericks, Hopatcong, N.J.

[73] Assignee: Addressograph Multigraph Corporation, Cleveland, Ohio

[22] Filed: Sept. 23, 1974

[21] Appl. No.: 508,350

Related U.S. Application Data

[62] Division of Ser. No. 443,706, Feb. 19, 1974.

[52] U.S. Cl. .................... 355/76; 29/505; 96/27 R; 156/74; 156/87; 354/19; 360/99

[51] Int. Cl.² .................... G03B 27/62

[58] Field of Search .................. 156/74, 87; 355/76; 354/19, 292; 29/505 X, 523; 360/99; 96/27 R

[56] References Cited

UNITED STATES PATENTS

| | | | |
|---|---|---|---|
| 2,775,172 | 12/1956 | Higonnet et al. | 354/19 |
| 2,950,353 | 8/1960 | Fomenko | 360/99 |
| 2,961,716 | 11/1960 | Luenberger | 156/74 |
| 3,369,227 | 2/1968 | Boissevain | 360/99 |

*Primary Examiner*—Edward G. Whitby

[57] ABSTRACT

An Indicia bearing disc of flexible plastic mounted and juxtaposed to a transparent mating solid disc rotated to provide rigidity to the flexible disc and method of projecting light onto the indicia for photocomposition.

2 Claims, 11 Drawing Figures

METHOD OF PROVIDING PHOTOCOMPOSITION INDICIA

This application is a division of U.S. Ser. No. 443,706, filed Feb. 19, 1974.

BACKGROUND OF THE INVENTION

The present invention relates to a new and improved method for providing an indicia disc for phototypesetters.

Indicia discs are commonly utilized in phototypesetting apparatus. Small discs are used in the form of unsupported photographic film. The larger indicia discs have previously been made by covering one side of a glass base member with a silver photosensitive coating and forming transparent characters in the coating. Although the glass indicia discs have been satisfactory in operation, they are relatively fragile and expensive to replace if they become broken. Further, if the emulsion is scratched, the entire disc is destroyed.

The glass disc of the prior art practice is a carefully made glass plate, coated with emulsion, exposed and developed as a photographic negative, and then finished. The finishing steps include some sizing, drilling and polishing that are relatively high in damage risk.

Further, each font requires a separate disc.

To overcome the breakage problem, indicia discs have been made from relatively flexible sheets of plastic. Although the sheet plastic indicia discs are more durable than the glass indicia discs, the flexibility of the sheet plastic discs limits the distance at which fonts of characters can be disposed outwardly of the center portion of the discs. To overcome both the breakage problem inherent with the glass indicia discs and the flexibility problem of discs formed of sheets of plastic, a clamp arrangement has been utilized to hold a film disc in the manner disclosed in U.S. Pat. No. 3,821,770, Ser. No. 332,477, filed Feb. 14, 1973, by William Rosenstein and entitled Composite Photocomposing Font Disc. Also, guides have been employed to serve as stabilizers for film discs, but effective guides are expensive, and they must be cleaned of abraded disc bits.

SUMMARY OF THE INVENTION

The present invention provides an improved indicia disc having a rigid support plate and a flexible sheet film disc carrying one or more fonts of characters. The flexible film disc is held as an operating unit with the rigid support plate by differential pressure created by centrifugal force pumping of air out of the matching interface. If the glass support plate should be cracked or broken, the relatively expensive film disc can be reused in association with a replacement support plate.

In accordance with one feature of the present invention, the indicia disc is constructed by placing a rigid support plate in abutting engagement with a flexible film disc setting forth various fonts of characters. The film disc and support plate are then rotated about their central axes at a relatively high speed to expel the atmosphere from between the film disc and the support plate under the influence of centrifugal force. As atmosphere is expelled from between the film disc and the support plate, the atmospheric pressure on the outer surface of the film disc presses the inner surface of the film disc firmly against the support plate to hold them against movement relative to each other.

According to this invention, a glass disc is finished without emulsion. If broken, the loss is only a fraction of the prior art disc loss. Further, each machine requires only one disc whereas prior practice requires a disc for each font.

The surprising discovery of this invention is that a separate film will cling to the surface of a rotating support plate as tightly as if adhered thereto, but without being permanently attached.

An experiment was performed to gain some insight into the effect of different conditions when the film disc was run without a guide using a glass disc cover plate as a support.

The first experiment was with a shim, 0.028 thick and 6 inches in diameter, between the font and the glass disc, concentric with the spindle. At the 2100 RPM speed the 8 ½ inch diameter film disc clung tightly to the cover plate. Examination with a synchronized strobe indicated total stability from the radii of the two font rows out to the extreme edge of the disc.

A variable speed motor was then attached to the spindle assembly and the speed was slowed to 300 RPM.

Gradually the speed was increased to 600 RPM noting that the font vibrated relative to the cover glass. At 900 RPM this phenomenon disappeared, the 0.028 shim between film font and cover glass not withstanding. The system was stable.

The film font was then removed and rolled into a tight cylinder about 1 ½ inches in diameter. It uncurled with a positive curl away from flat, the arc being about 18 inches radius. The film disc was replaced, curl away from the glass cover plate. The 0.028 shim was still between the film disc and the glass cover plate. It was not until 1600 RPM that the centrifugal effect flattened the film disc against the glass cover plate. However, at 1600, the system appeared stable under a synchronized strobe light.

Finally the shims were removed and the film type disc placed directly between the back up plate and the glass cover plate. At 900 RPM there was no doubt that the centrifugal effect flattened out the film type font and held it stable against the glass.

To provide flexibility in associating various fonts of characters, in one embodiment of the invention the film disc is formed in two segments. Both of the segments are held against a support plate by atmospheric pressure.

The speed specification above is qualitative, because a specific example, as given under the Summary title, is dependent on a few variables. These variables only require a test of minutes' duration to determine whether a given assembly qualifies as being a derivative of this invention, and may be done by any machine operator or technician.

It is an object of this invention to provide a new and improved method of making an indicia disc by simultaneously rotating a flexible sheet member and a support member about a common axis to expel atmosphere from between the flexible sheet member and support member so that atmospheric pressure against an outer surface of the sheet member will hold it firmly against the support member.

DESCRIPTION OF THE PREFERRED EMBODIMENT

Figure 1:
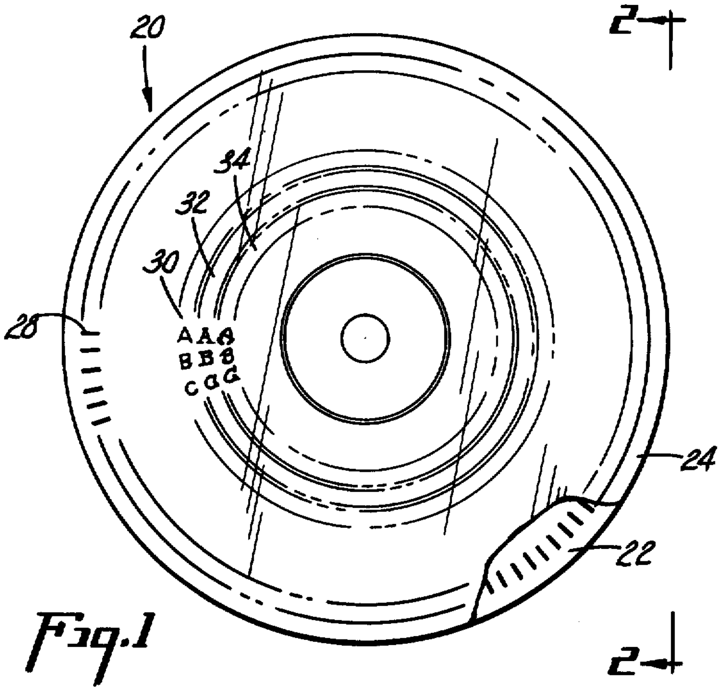
FIG. 1 is a plan view of an indicia disc constructed in accordance with the present invention.
Figure 2:
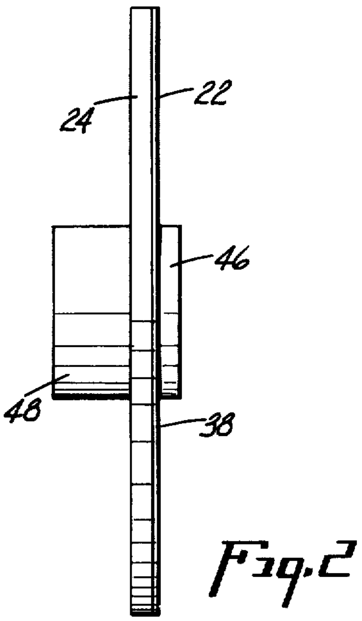
FIG. 2 is a side view, taken generally along the line 2—2 of FIG. 1.

An indicia disc 20 constructed in accordance with the present invention is illustrated in FIG. 1 and includes a film disc 22 which is formed of a flexible transparent plastic sheet material and is mounted on a relatively rigid glass support plate 24 (see FIG. 2). The film disc 22 is provided with a circular array of position marks 28 and a plurality of fonts 30, 32 and 34 of print characters. The position marks 28 and circular fonts of characters 30, 32 and 34 are designed to cooperate with a known phototypesetting apparatus. This phototypesetting apparatus cooperates with the marks 28 to locate the indicia disc 20 relative to an optical system and light source to expose a photosensitive film (not shown). When the indicia disc 20 has been located in the proper position relative to the film, a flash tube is activated to project a beam of light through the transparent support plate 24 and a transparent character of one of the type fonts 30, 32 or 34 onto the film in a known manner. Although many different types of phototypesetting apparatus could be utilized in association with the indicia disc 20, one suitable phototypesetting apparatus is disclosed in U.S. Pat. No. 2,775,172.

For convenience of illustration and description, the areas of the film disc 22 which form the transparent characters of the type fonts 30, 32 and 34 and the transparent timing marks 28 have been illustrated in the drawings as being dark areas. The opaque areas of the film disc 22 have been illustrated in the drawings as light areas.

Figure 3:
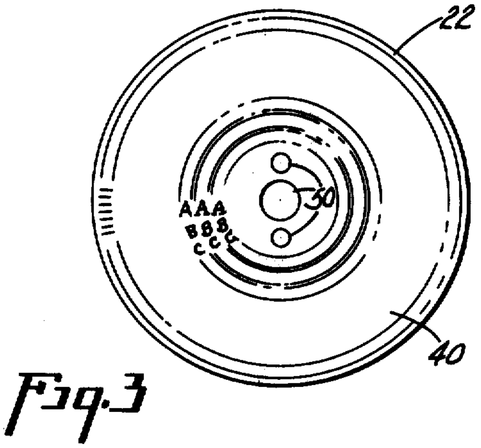
FIG. 3 is a plan view of a flexible film disc which forms a part of the indicia disc of FIG. 1.
Figure 4:
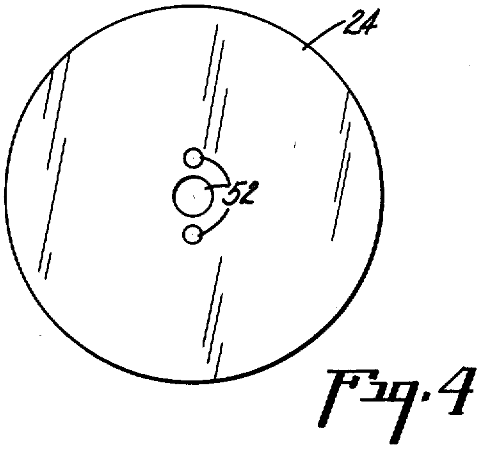
FIG. 4 is a plan view of a rigid support plate which is utilized as a base for the flexible film disc of FIG. 3.

In accordance with a feature of the present invention, the flexible film disc 22 is secured against movement relative to the rigid glass support plate 24 under the influence of atmospheric pressure and without the use of adhesives. To interconnect the film disc 22 (see FIG. 3) and the support plate 24 (see FIG. 4), a major side surface 40 of the film disc 22 is placed in abutting engagement with a circular major face surface 42 of the support plate 24 (see FIGS. 5 and 6). a back plate 46 is placed against a major outer side surface 38 of the film disc 22 and is connected with a locking member 48 by a plurality of pins which extend through openings 50 in the film disc 22 and openings 52 in the support plate 24 (see FIGS. 3 and 4).

After the side surface 40 of the film disc 22 has been positioned in abutting engagement with the side surface 42 of the support plate 24, a drive shaft 56 rotates the film disc 22 and support plate 24 about a common central axis at a relatively high speed. As the film disc 22 and support plate 24 are rotated, atmosphere is expelled from between the film disc and support plate under the influence of centrifugal force in the manner illustrated schematically in FIG. 6. As air, indicated by the arrows 58 in FIG. 6, flows out from between the film disc 22 and support plate 24, a partial vacuum is established. As this occurs, the film disc 22 is pressed firmly against the support plate 24 by atomospheric pressure, represented by the arrows 62 in FIG. 6. Although the film disc 22 is shown as being separated at its radially outer end portion from the support plate 24 in FIG. 6, it should be understood that as the film disc and support plate are rotated by the drive shaft 56, the film disc is pressed flat against the support plate (in the manner shown in FIG. 2). The atmospheric pressure against the outer surface 38 of the film disc 22 is effective to maintain it in flat abutting engagement with the support plate 24 without adhesives when the rotation of the film disc 22 and support plate 24 is interrupted.

Figure 5:
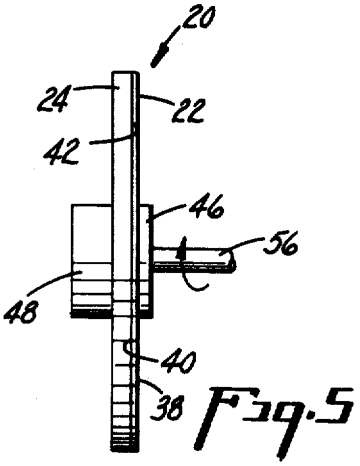
FIG. 5 is a schematic illustration depicting rotation of the flexible film disc of FIG. 3 and support plate of FIG. 4 about a common axis.
Figure 6:
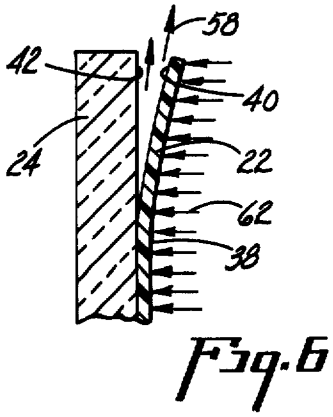
FIG. 6 is a schematic illustration depicting the mounting of the film disc on the support plate.
Figure 7:
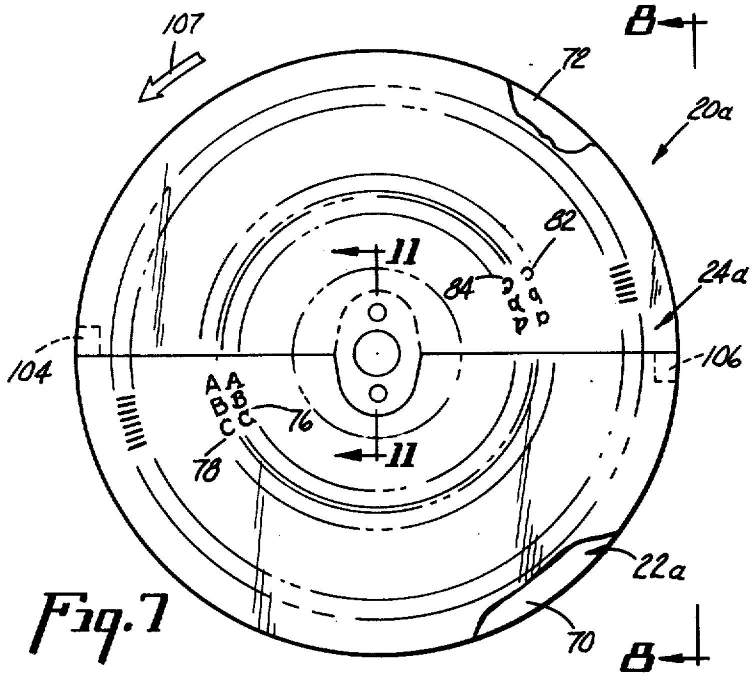
FIG. 7 is a plan view of an indicia disc forming a second embodiment of the invention.
Figure 8:
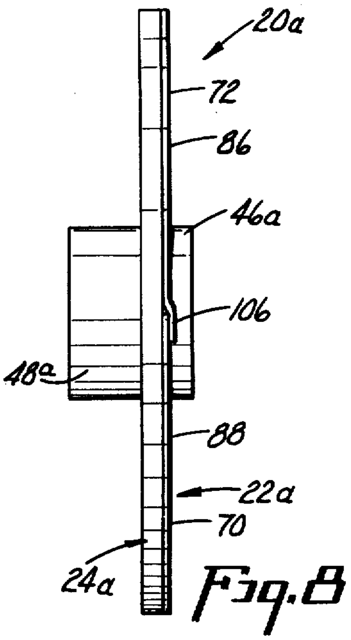
FIG. 8 is a side view, taken generally along the line 8—8 of FIG. 7.
Figures 9, 10:
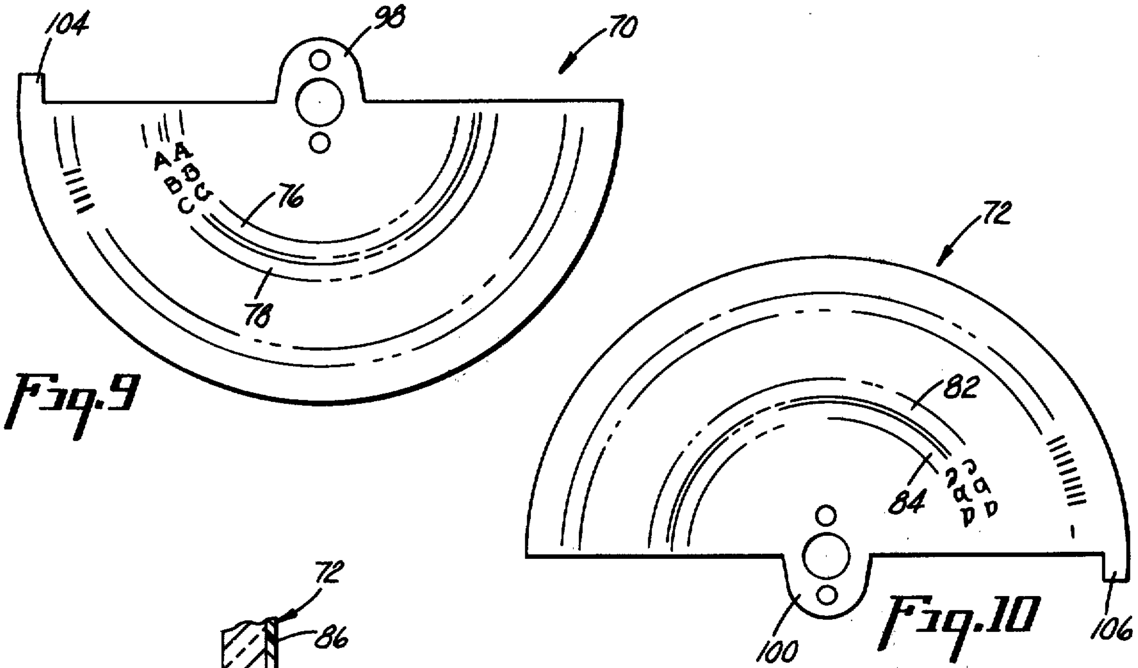
FIG. 9 is a plan view of a film segment utilized in the indicia disc of FIG. 7.
FIG. 10 is a plan view of a second film segment utilized in the indicia disc of FIG. 7.

If the glass support plate 24 should be broken due to rough handling or other reasons, the film disc 22 can be disengaged from the pieces of the glass support plate and mounted on another glass support plate by rotating the film disc and replacement support plate together in the manner illustrated schematically in FIG. 5. This enables the relatively expensive film disc 22, on which the fonts of characters 30, 32 and 34 are disposed, to be reused even though the glass support plate is broken. It should be noted that the major surface 42 of the rigid glass support plate 24 functions as a focal plane for the film disc 22 and that the rigid support plate prevents the flexible film disc from being deflected transversely during use.

In the embodiment of the invention illustrated in FIGS. 1–6 the film disc 22 is formed as an integral member with a plurality of type fonts 30, 32 and 34. It is contemplated that different users of the indicia disc 20 will want different combinations and sizes of type fonts. For example, one user may want a combination of Roman and italic characters while another user may desire a combination of Greek letters, Roman letters and numerals. In order to provide increased flexibility in associating the various fonts of characters, the embodiment of the invention illustrated in FIGS. 7–11 provides a film disc which is made up of two segments. It is contemplated that a relatively large number of standard disc segments having different fonts of characters will be made up. By selecting any two of the plurality of different disc segments, a user can select any one of a plurality of different fonts of characters. Since the components of the embodiment of the invention illustrated in FIGS. 7–11 are similar to the components of the embodiment of the invention illustrated in FIGS. 1–6, the same numerals will be utilized to designate the components of the embodiment of the invention illustrated in FIGS. 7–11 as were utilized in association with the components of FIGS. 1–6. However, to avoid confusion, the suffix letter "*a*" will be associated with the numerals utilized to designate the components of FIGS. 7–11.

An indicia disc **20*a* (see FIGS. 7 and 8) includes a film disc 22*a* which is mounted on a rigid transparent support plate 24*a*. The film disc 22*a* includes a pair of flexible sheet film segments 70 and 72 (see FIGS. 7 and 10). Each of the sheet film segments 70 and 72 includes a plurality of complete fonts of alpha numeric characters. Thus, the film disc segment 70 includes two complete fonts of characters 76 and 78 which are arranged in a semicircular array. Similarly, the sheet film disc segment 72 includes a plurality of complete fonts 82 and 84 of alpha numeric characters which are arranged in a semicircular array. Although the various fonts of characters 76, 78, 82 and 84** could be identical, it is contemplated that each of the fonts will contain characters of a different size or configuration.

Figure 11:
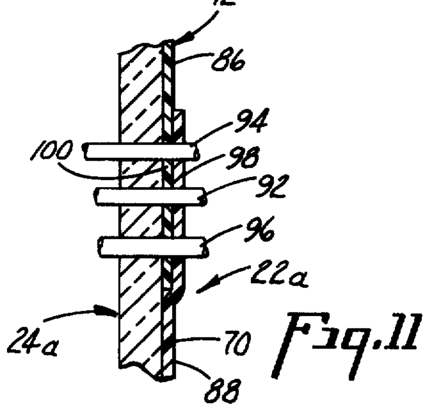
FIG. 11 is a sectional view, taken generally along the line 11—11 of FIG. 7.

The two flexible film disc segments 70 and 72 are secured to the rigid front plate 24*a* under the influence of atmospheric pressure applied against outer surface 86 and 88 of the film disc segments (see FIG. 11). In mounting the film disc segments 70 and 72 on the support plate 24*a*, the two film disc segments are positioned relative to the support plate by a plurality of pins 92, 94 and 96. Thus, the two film disc segments 70 and 72 are formed with projecting central portions 98 and 100 (see FIGS. 9 and 10) which are disposed in an overlapping relationship on the support plate 24*a* (see FIG. 11). The pins 92, 94 and 96 extend through aligned openings in the sets of projections 98 and 100 on the film disc segments into engagement with a backing plate 46*a* (FIG. 8) and a locking assembly 48*a*.

The two film disc segments 70 and 72 are provided with tabs 104 and 106 which are disposed in an overlapping relationship. Thus, the tab 104 on the film disc segment 70 is disposed in an overlapping relationship with a film disc segment 72 (see FIG. 7). Similarly, the tab 106 on the film disc segment 72 is disposed in an overlapping relationship with the film disc segment 70. Since the indicia disc 20*a* is rotated in the direction of the arrow 107 in FIG. 7, the tabs 104 and 106 extend from the trailing edge portions of the disc segments 70 and 72 and are effective to press them against the support plate 24*a*.

Once the film disc segments 70 and 72 have been positioned adjacent the support plate 24*a*, the support plate and film disc segments are rotated about a common axis by a drive member, similar to the drive shaft 56 of FIG. 5. As the film disc segments 70 and 72 are rotated with the support plate 24*a*, air is expelled from between the film disc segments and the support plate so that atmospheric pressure presses the film disc segments against the support plate in the same manner as previously explained in connection with the embodiment of the invention illustrated in FIGS. 1–6. The atmospheric pressure against the disc segments 70 and 72 is effective to hold them in place on the support plate 24*a* without using adhesives between the segments and support plate.

In view of the foregoing description it can be seen that the present invention provides an improved indicia disc 20 having a rigid support plate 24 and a flexible sheet film disc 22 carrying one or more fonts of characters. The flexible film disc is held against movement relative to the support plate independently of adhesives by artificially induced atmospheric pressure differential forces against an outer surface 38 of the sheet film disc. To provide for flexibility in associating various fonts of characters, the sheet film disc can be divided into two segments 70 and 72 in the manner illustrated in FIG. 7.

What is claimed is:

1. The method of obtaining and projecting a series of characters in light and shadow image for photocomposition, comprising the steps of:

providing a photocomposition machine having a power driven disc mount hub;

providing a font disc comprised of a character transparency disc characterized by a physical rigidity insufficient to be self-supporting in a planar condition under static gravitational conditions;

providing a ridged base member having a planar face surface;

assembling said disc and base on said hub in a relative nonrotatable relationship with said font disc adjacent said planar face of the base, and pumping air out of the space between the disc and base by rotating said assembly at a speed at least equal to that required to produce a centrifugal pumping action which expels said trapped air and results in an atmospheric pressure differential forcing said disc into intimate contact with said base over essentially the entire mutual surfaces therebetween.

2. The method as set forth in claim 1 further including the step of providing a second font disc of the same descriptive character as said first disc, placing said members in abutting engagement with the planar face surface of the rigid base member and securing the first and second member against movement relative to the base member.

* * * * *